United States Patent Office 3,516,800
Patented June 23, 1970

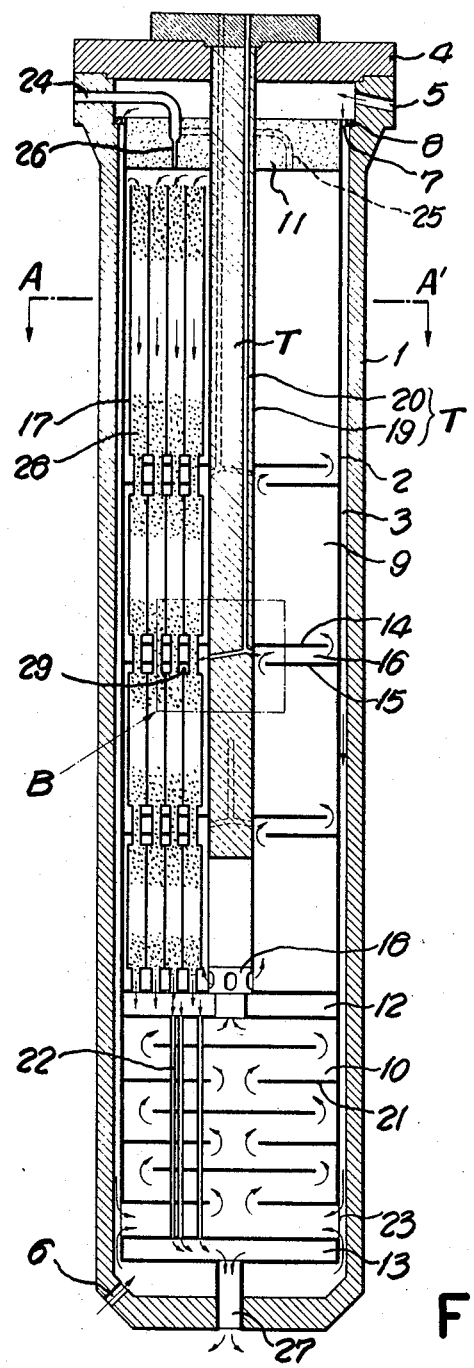
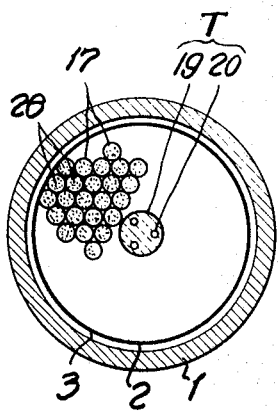
FIG. 2.
FIG. 1.

3,516,800
SYNTHESIS REACTION APPARATUS EQUIPPED
WITH MEANS FOR TEMPERATURE CONTROL
OF CATALYST BED
Hisao Yamamoto, 2, 1811 Aza tateyama, Oaza Ogushi,
and Noboru Iwaasa, 1, 330 Yuda, Oaza Ogushi, both of
Ube-shi, Yamagushi-ken, Japan
Filed Aug. 25, 1965, Ser. No. 482,415
Int. Cl. B01j 9/04
U.S. Cl. 23—288                                   1 Claim

ABSTRACT OF THE DISCLOSURE

A reactor having an inner cylinder disposed within an outer cylinder so as to provide an annular space between the cylinders. The inner cylinder is provided with a heat exchanger having a plurality of reaction gas tubes and a plurality of baffle plates, and with a reaction chamber having a plurality of catalyst tubes arranged in parallel and being longitudinally disposed therein. The reactor further includes a plurality of chambers formed by pairs of baffle plates installed perpendicularly to the axis of the inner cylinder in the spaces formed between the catalyst tubes and in the spaces between the catalyst tubes and the inner cylinder. The spaces between the catalyst beds provide passages of unreacted gas for cooling the catalyst tubes. Cooling gas pipes are connected to the chambers from the outside and the diameter of the catalyst tubes is reduced at the zone passing through the chamber to form said spaces.

---

This invention relates to an apparatus for performing exothermic synthesis reactions such as ammonia synthesis and methanol synthesis which is equipped with means for temperature control of catalyst bed.

Such exothermic synthesis reaction apparatus may ordinarily be classified into an external heat exchange type and a self heat exchange type according to the mode of removing the reaction heat generated.

The external heat exchange type of apparatus is complicated in its construction due to the internal flow system of thermal medium which does not participate in the synthesis reaction. Moreover, it involves a disadvantage such that the temperature of catalyst bed becomes too high at the upstream of coolers while it becomes too low at the downstream thereof.

The self heat exchange type of apparatus involves a problem of the difficulty of the effective temperature control of catalyst bed for carrying out the isothermal operation.

Referring to the ammonia synthesis reaction, the reaction velocity is decreased successively with the increase in concentration of ammonia. This means that the heat generated per unit volume of catalyst is decreased. Consequently, at the inlet portion of the catalyst bed a large quantity of heat is generated which causes rapid elevation of the bed temperature, and contrarily, at the outlet portion a small quantity of heat is generated which causes the gradual elevation of the bed temperature.

In accordance with the above facts, it is desirable for carrying out the effective isothermal operation that the thermal conductivity of the catalyst bed is adjusted higher at the inlet portion and lower at the outlet portion.

For this purpose, there is proposed a method of passing unreacted cooling gas concurrently with reaction gas and a method of passing the same countercurrently therewith.

In the concurrent system, there is a tendency of the catalyst bed temperature at the outlet portion becoming higher. In consideration of the reaction velocity and the equilibrium concentration, it is obvious that the lower temperature at the higher concentration of ammonia is advantageous to the reaction. On the other hand, in the countercurrent system, the catalyst bed temperature of the inlet portion may possibly become too high, causing the deterioration of catalyst, while the bed temperature of the outlet portion may become so low that the reaction temperature is difficult to maintain.

This invention eliminates the above mentioned disadvantages and accomplishes the high efficiencies of the synthesis reactions according to a special construction of reaction apparatus as set forth hereinafter.

In accordance with this invention, there is provided a structure of exothermic synthesis reaction apparatus wherein an inner cylinder is disposed within an outer cylinder so as to provide an annular space therebetween, said inner cylinder being provided with a heat exchanger chamber having a plurality of reaction gas tubes and a plurality of baffle plates and with a reaction chamber having a plurality of catalyst tubes arranged in parallel and being longitudinally disposed therein, said structure further comprising a plurality of chambers formed by pairs of baffle plates installed perpendicularly to the axis of the inner cylinder in spaces formed between the catalyst tubes and in the spaces between the catalyst tubes and the inner cylinder, said spaces between the catalyst beds providing passages of unreacted gas for cooling the catalyst tubes provided in the reaction chamber, cooling gas pipes being connected to said chambers from the outside, and the diameter of the catalyst tubes being reduced at the zone passing through the chamber to form said spaces.

This invention is now described in reference to the accompanying drawings.

FIG. 1 is a longitudinal cross-sectional view of an embodiment of this invented synthesis reaction apparatus equipped with means for temperature control of catalyst bed, which is applied to the ammonia synthesis reaction;

FIG. 2 is transverse cross-sectional view of the apparatus taken on the line A–A' of FIG. 1;

Figure 3:
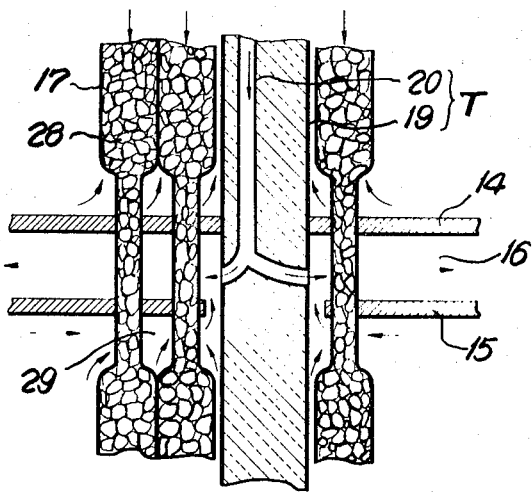
FIG. 3 shows an essential part of catalyst tubes (corresponding to the part B of FIG. 1)

An inner cylinder 2 is placed in an outer cylinder 1 with an annular space 3 from the inside wall of the outer cylinder 1.

The top of the outer cylinder 1 is gas-tightly closed with a closure 4. A inlet for unreacted cooling gas 5 is located at a position close to the top of the outer cylinder 1 and a main inlet for unreacted gas 6 at a position close to the bottom thereof.

A spacing ring 8 having a number of perforations 7 is set in the annular space 3 at the top of the inner cylinder 2.

The inner cylinder 2 is provided with a reaction chamber 9 in the upper portion and a heat exchange chamber 10 in the lower portion.

The inner cylinder 2 is gas-tightly closed at the top with an insulation plate 11. The reaction chamber 9 and the heat exchange chamber 10 are partitioned by a gas collection chamber 12 and the heat exchange chamber 10 and the inside of the outer cylinder 1 are partitioned by another gas collection chamber 13 with an annular space around the circumference thereof.

The reaction chamber 9 is divided into a plurality of (reaction) stages by a plurality of chambers 16 constructed with a pair of baffle plates 14 and 15 in the reaction chamber 9.

A plurality of catalyst tubes 17 is in parallel and longitudinally arranged in the reaction chamber 9. The catalyst tubes 17 are opened at the top and are connected at the bottom with the gas collection chamber 12. The catalyst tubes 17 are contracted at the position of each chamber 16 to form small gaps 29. Each catalyst tube 17 is packed with catalyst 28.

An unreacted gas distribution nipple 18 is mounted at the bottom of the reaction chamber 9, which communicates the reaction chamber 9 directly with the heat exchange chamber 10 across the gass collection chamber 12.

The reaction chamber 9 is further equipped at the center with temperature control means T for catalyst bed in the catalyst tubes 17.

The temperature control means T is constructed by setting a plurality of cooling gas pipes 20 in a temperature control tube 19 and filling up the space between the cooling gas pipes and the inside wall of the temperature control tubes 19 with insulation material.

The temperature control means T extends downward in the reaction chamber 9 throuh the closure 4 and the insulation plate 11.

The inlets of the cooling gas pipes 20 are connected to outside transfer lines not shown in the drawings and to the outlet opened to every chamber 16.

The heat exchange chamber 10 is provided with a plurality of baffle plates 21 and a plurality of reacted gas tubes 22 extending from the gas collection chamber 12 to the other gas collection chamber 13 through the heat exchange chamber 10. A slit 23 is opened around the whole circumference of the side wall of chamber between the lowermost baffle plate 21 and the upper surface of the gas collection chamber 13, whereby the heat exchange chamber 10 is directly communicated with the inside of the outer cylinder 1.

A conduit 24 is used for introducing the preheated unreacted gas in the start-up operation of this reaction apparatus and for charging the unreacted cooling gas in the normal operation in order to prevent the local heat of catalyst bed at the top portion. Passages 25 and 26 are bored in the insulation plate 11 of the inner cylinder 2 for those purposes. Reference numeral 27 indicates an outlet for reacted gas.

The function and the operation of this invented apparatus is described in the following.

A major portion of unreacted gas enters the apparatus at the main inlet 6. Another portion of unreacted gas enters at the inlet for unreacted cooling gas 5 in order to cool the outer cylinder 1, passes through the perforations 7 of the spacing ring 8, and flows down in the annular space 3. The unreacted gas and the unreacted cooling gas are admixed and flow into the heat exchange chamber 10 of the inner cylinder 2 from the slit 23 provided in the heat exchange chamber 10. The admixture of unreacted gases is heated by the heat exchange with the reacted gas flowing down in the reacted gas tubes 22 during it passes through the plural baffle plates 21 and then it enters the reaction chamber 9 through the gas distribution nipple 18.

The unreacted gas flows upward through gaps between each catalyst tube 17 and between the outer face of the catalyst tubes 17 and the inner face of the reaction chamber 9 and cools the catalyst tubes 17.

On the other hand, the cooling gas flows in the cooling gas pipes 20 of the temperature control means T through the outside transfer lines not shown in the drawings and is fed into each chamber 16.

Then the cooling gas passes through gaps 29 in the contracted portions of the catalyst tubes 17, is diffused in the reaction chamber 9, is uniformly mixed with the unreacted gas resulting in the reduction of the temperature thereof, and flows up while cooling the catalyst tubes 17. The gas adjusted at a suitable temperature for the synthesis reaction enters the catalyst tubes 17 at the top thereof.

The unreacted gas is reacted by the action of catalyst 28 packed in the catalyst tubes 17 during it passes in the catalyst tubes 17.

The reacted gas containing 20% of ammonia flows into the gas collection chamber 12 from the bottom of the catalyst tubes 17 and passes downward in the reacted gas tubes 22 of the heat exchange chamber 10. The reacted gas is heat exchanged with the unreacted gas which enters the heat exchange chamber 10 from the slit 23 during it flows down in the reacted gas tubes 22 and is discharged to the outside of the outer cylinder 1 of catalytic synthesis reaction apparatus from the outlet 27 via the gas collection chamber 13.

The sensible heat of the discharged product gas is recovered in a waste heat boiler to generate about 0.8 ton of steam per ton of ammonia.

Now the advantages of this invention are described in the following.

The temperature control means T installed in the synthesis reaction apparatus prevents the subcooling of the outlet portion of catalyst bed according to the reduced efficiency of heat conductivity resulting from the decreased velocity of the unreacted cooling gas at the outlet portion of catalyst bed and at the same time prevents the overheating of the inlet portion of catalyst bed according to the increased efficiency of heat conductivity resulting from the increased velocity of the unreacted cooling gas at the inlet portion of catalyst bed. Further, it is noticeably effective in the prevention of the local heating of catalyst bed.

In general, the spot of violent reaction, namely the point on which the rapid temperature elevation is observed, moves gradually for the outlet of catalyst bed when the deterioration of catalyst 28 occurs. In such case, an appropriate utilization of the present temperature control means T may respond successfully to the change of temperature.

The following is an example of synthesis reaction performed in this invented apparatus.

A nitrogen-hydrogen mixture of the ratio of about 1:3 containing 1.8% ammonia is used as feed gas. The temperature of catalyst bed is maintained at 450–520° C. and the pressure at 300 atms.

The unreacted gas enters from the main inlet 6 at 150° C., is heated by the reacted gas tubes 22 in which the reacted gas flows at 450–330° C. to raise the temperature at 390° C. at the gas distribution nipple 18. The temperature of gas becomes finally at 490° C. at the inlet of the catalyst tubes 17.

The temperature of unreacted gas for cooling is 25° C., which is introduced into the apparatus from the inlet for unreacted cooling gas 5, the cooling gas pipes 20 and the unreacted cooling gas conduit 24. The unreacted gas is cooled from about 490° to 420° C. with the cooling gas at the outlet of the cooling gas pipes 20.

The outlet temperature of catalyst tubes 17 is 450° C. and the temperature in the reacted gas tube is 330° C.

Figure 4:
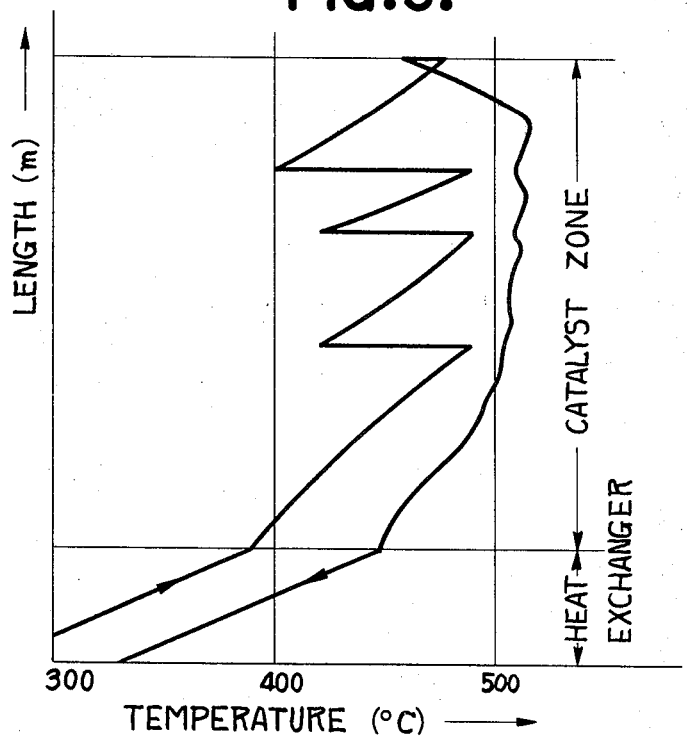
FIG. 4 shows a curve of temperature changes in the catalyst bed of the present apparatus.

FIG. 4 shows a curve indicating the relation between the length of catalyst bed (axis of ordinates) and the temperature of gas passing through the catalyst bed (axis of abscissas) which is obtained in the present invented apparatus.

What is claimed is:

1. In an apparatus for exothermic synthesis reaction comprising an inner cylinder disposed within an outer cylinder so as to provide an annular space therebetween, said cylinders having their longitudinal axes vertically disposed, said inner cylinder having an intermediate gas collection chamber dividing said inner cylinder into an upper reaction chamber and a lower heat exchange chamber, an outlet gas collection chamber below said heat exchange chamber, said heat exchange chamber having a plurality of reacted gas tubes communicating with said outlet gas collection chamber, outlet means leading from said outlet gas collection chamber for conducting reacted gases externally of said apparatus, main unreacted gas inlet means conducting unreacted gas from an external source into said heat exchange chamber, said reaction chamber having a plurality of catalyst tubes arranged in parallel and being longitudinally disposed therein, said reaction chamber also having a plurality of passages formed by spaced pairs of baffle plates disposed perpendicularly to the axis of the inner cylinder in spaces formed between said catalyst tubes and in spaces between the catalyst tubes and said inner cylinder, said catalyst tubes having reduced diameters between said spaced pairs of baffle plates, passage means between said heat exchange chamber and said reaction chamber to pass unreacted gas from said heat exchange chamber to said reaction chamber, said unreacted gas passing through said reaction chamber to enter the upper ends of said catalyst tubes to pass downwardly through the latter to said intermediate gas collection chamber, said reacted gas tubes, said outlet gas collection chamber, and said outlet means, said reaction chamber having secondary unreacted gas inlet means, said latter means communicating with said annular passage between said inner and outer chambers to pass unreacted gas through said annular passage, passage means between said annular passage and said heat exchange chamber, and temperature control means in said reaction chamber comprising a cooling conduit leading from an external source into said reaction chamber and having a plurality of branch discharge conduits leading into each of said passages formed by said pairs of baffle plates whereby unreacted gas is passed through said cooling conduits and said catalyst tubes in passing into said reaction chamber.

References Cited

UNITED STATES PATENTS 2,512,586  6/1950  Stengel _____ 23—289

FOREIGN PATENTS 641,000  1/1964  Belgium.

JAMES H. TAYMAN, Jr., Primary Examiner

U.S. Cl. X.R.

23—1, 199, 284, 289